US007801813B2

(12) United States Patent
Brown et al.

(10) Patent No.: US 7,801,813 B2
(45) Date of Patent: Sep. 21, 2010

(54) SELECTIVE ESCROW USING ELECTRONIC FUNDS TRANSFER (75) Inventors: Owen H. Brown, Montclair, NJ (US); David N. Joseph, Bowdoinham, ME (US)

(73) Assignee: Davo Financial Services LLC, Montclair, NJ (US)

( * ) Notice: Subject to any disclaimer, the term of this patent is extended or adjusted under 35 U.S.C. 154(b) by 1432 days.

(21) Appl. No.: 10/775,751

(22) Filed: Feb. 9, 2004

(65) Prior Publication Data

US 2004/0193540 A1 Sep. 30, 2004

Related U.S. Application Data (63) Continuation-in-part of application No. 10/010,340, filed on Dec. 5, 2001, now abandoned.

(60) Provisional application No. 60/445,782, filed on Feb. 7, 2003.

(51) Int. Cl.
*G06Q 40/00* (2006.01)
(52) U.S. Cl. ...................................... 705/39
(58) Field of Classification Search ................ 705/37, 705/36 R, 35, 38, 39
See application file for complete search history.

(56) References Cited

U.S. PATENT DOCUMENTS

| | | | | | |
|---|---|---|---|---|---|
| 2,003,010 | A | * | 5/1935 | Nixon | 417/133 |
| 4,750,119 | A | * | 6/1988 | Cohen et al. | 705/14 |
| 5,138,549 | A | * | 8/1992 | Bern | 705/31 |
| 5,644,724 | A | * | 7/1997 | Cretzler | 705/19 |
| 5,774,872 | A | * | 6/1998 | Golden et al. | 705/19 |
| 5,799,283 | A | * | 8/1998 | Francisco et al. | 705/19 |
| 5,825,881 | A | * | 10/1998 | Colvin, Sr. | 705/78 |
| 5,868,236 | A | * | 2/1999 | Rademacher | 194/217 |
| 5,875,433 | A | * | 2/1999 | Francisco et al. | 705/26 |
| 5,991,750 | A | * | 11/1999 | Watson | 705/44 |
| 6,016,479 | A | * | 1/2000 | Taricani, Jr. | 705/19 |
| 6,078,898 | A | * | 6/2000 | Davis et al. | 705/19 |
| 6,078,899 | A | * | 6/2000 | Francisco et al. | 705/19 |
| 6,183,140 | B1 | * | 2/2001 | Singer et al. | 705/31 |
| 6,230,928 | B1 | * | 5/2001 | Hanna et al. | 221/13 |
| 6,260,024 | B1 | | 7/2001 | Shkedy | |

(Continued)

OTHER PUBLICATIONS

UK Auction Site Takes on Europe and ebay, John Lamb, Information Week, n809, pp. 68, Oct. 23, 2000.*

(Continued)

*Primary Examiner*—Alexander Kalinowski
*Assistant Examiner*—Bruce I Ebersman
(74) *Attorney, Agent, or Firm*—Katten Muchin Rosenman LLP (57) ABSTRACT

A method is employed to impound funds from merchant sales electronically in an escrow account for later use such as payment of associated sales taxes. An electronic funds processor (EFP) determines escrow information for credit/debit card charge payment requests made by the merchant via a credit/debit card terminal, forwards the requests to one or more credit/debit card issuers, extracts an escrow amount from payments made by the issuers to the merchant, and credits an escrow account of the merchant with the extracted amounts. An escrow agent periodically makes payments from the escrow account, and provides associated reporting to the merchant. The merchant is able to report cash sales via the credit/debit card terminal, and associated escrow amounts are extracted from credit/debit card payments or from another merchant account.

8 Claims, 4 Drawing Sheets

U.S. PATENT DOCUMENTS

| | | | | |
|---|---|---|---|---|
| 6,684,196 | B1* | 1/2004 | Mini et al. | 705/26 |
| 6,889,200 | B2* | 5/2005 | Agee et al. | 705/19 |
| 6,898,573 | B1* | 5/2005 | Piehl | 705/31 |
| 6,983,261 | B1* | 1/2006 | Francisco et al. | 705/39 |
| 6,993,502 | B1* | 1/2006 | Gryglewicz et al. | 705/31 |
| 7,194,426 | B1* | 3/2007 | Box | 705/26 |
| 7,379,907 | B2* | 5/2008 | Dang et al. | 705/31 |
| 7,464,057 | B2* | 12/2008 | Cole et al. | 705/42 |

OTHER PUBLICATIONS

Louisiana Senate Passes Plan to Pay recovery district debt, Christopher McEntee, Bond Buyer v. 316, n29915, p. 2, Jun. 10, 1996.*

Unmask the hidden costs of self-employment, Home Office Computing, V10, n6, p. 62-6, Jun. 1992.*

United States Patent and Trademark Office Decision of Appeal dated Dec. 10, 2007, issued for the corresponding U.S. Appl. No. 10/010,340.

* cited by examiner

EXAMPLE 1 – credit card closeout based on 6% sales tax

| | |
|---|---|
| Credit Card Sales | $1000.00 |
| Total Sales Tax Escrowed | $ 60.00 |
| Net Credit Card Deposit | $ 940.00 |

FIG. 4A

EXAMPLE 2 – credit card and cash closeout based on 6%

| | |
|---|---|
| Credit Card Sales | $1000.00 |
| Cash Sales | $ 500.00 |
| Total Sales | $1500.00 |
| Total Sales Tax Escrowed | $ 90.00 |
| Net Credit Card Deposit | $910.00 |

FIG 4B

EXAMPLE 3 – credit card, cash and non-taxable sales based on 6%

| | | |
|---|---|---|
| Taxable Credit Card Sales | | $1000.00 |
| Taxable Cash Sales | | $ 500.00 |
| Non-Taxable Sales | Credit | $ 200.00 |
| | Cash | $ 300.00 |
| Total Sales | | $2000.00 |
| Total Taxable Sales | | $1500.00 |
| Tax Escrow | | $ 90.00 |
| Net Credit Card Deposit | | $1110.00 |

(credit card sales plus non-taxable credit card sales, minus tax escrow)

| | |
|---|---|
| Net cash in hand | $ 800.00 |

(taxable cash sales plus non-taxable cash sale)

FIG. 4C

SELECTIVE ESCROW USING ELECTRONIC FUNDS TRANSFER

CROSS-REFERENCE TO RELATED APPLICATION

The present application is a continuation-in-part of and claims priority under 35 U.S.C. §120 from U.S. patent application Ser. No. 10/010,340, which was filed on Dec. 5, 2001 now abandoned, and under 35 U.S.C. §119(e) from U.S. Provisional Patent Application Ser. No. 60/445,782, which was filed on Feb. 7, 2003. The disclosures of U.S. patent application Ser. Nos. 10/010,340 and 60/445,782 are hereby incorporated by reference.

FIELD OF THE INVENTION

The present invention relates to a method for impounding escrow funds from debit/credit card payments made to a merchant. More specifically, the present invention relates to a method for impounding escrow funds from debit/credit card payments made to a merchant, where the impounded escrow funds are determined in relation to at least one of credit, debit and cash sales made by the merchant.

BACKGROUND OF THE INVENTION

Computers facilitate with high speed and accuracy a vast myriad of commercial transactions—including credit card transactions. Merchants, who collect from their customers not only the retail charges for purchased goods and services but in addition collect customer payments for sales taxes on those purchases, are responsible for periodically transmitting to the appropriate taxing authority the accumulated tax payments received, typically monthly or quarterly for State taxing authorities. At the end of each such period, some merchants find that they have spent or otherwise failed to segregate and retain sufficient funds to make the required tax payment to the taxing authority.

There is a need to for an improved method by which a merchant may allocate and escrow funds for periodic payment of customer sales taxes owed to a tax authority. Toward this end, it is highly desirable that the improved method enable collection, escrowing and payment to be performed by one or more third parties in order to enable the merchant's direct participation may be limited to a "passive" role. In addition, the method must be capable of generating appropriate payment forms and reports as required by the merchant and the taxing authority.

SUMMARY OF THE INVENTION

A method is disclosed for impounding escrow funds by an electronic funds processor (EFP) associated with sales transactions of a merchant during a close-out period. The method includes the steps of determining a first sales amount associated with one or more sales transactions of the merchant during the closeout period, determining a second sales amount specifically associated with one or more credit/debit card transactions of the merchant during the closeout period, determining an escrow amount based on the first sales amount, determining whether the second sales amount exceeds the escrow amount, and crediting an escrow account with the escrow amount and a merchant account with an amount equal to the difference between the second sales amount and the escrow amount when the second sales amount exceeds the escrow amount.

In a preferred embodiment, the method impounds escrow funds for paying a sales tax owing on merchant sales. In this preferred embodiment, the first sales amount is associated with taxable sales transactions including at least one of taxable credit/debit card sales and taxable non-credit/debit card sales, and the second sales amount is associated with taxable and non-taxable credit/debit card transactions of the merchant made during the closeout period. An escrow agent (for example, a third-party bank or other financial institution) periodically makes payments from the escrow account, and provides associated reporting to the merchant and the associated tax authority.

In this manner, for example, a merchant may provide for ongoing and automatic collection of funds to pay sales taxes by the escrow agent. Similarly, the merchant may provide for periodic, automatic payment of taxes from the collected funds to tax authority. In this manner, the merchant's direct role in such collections effectively becomes passive.

The method also contemplates other applications in which a merchant desires or is otherwise required to effect a withholding of funds collected from credit-bases sales transactions (for example, by local, state and federal tax authorities, judicial authorities, and payees who have received legal judgments against a merchant). In addition, the method contemplates impounding merchant escrow funds for paying back payroll taxes or back real estate taxes, or for effecting a merchant savings account.

BRIEF DESCRIPTION OF THE DRAWINGS

A more complete understanding of the invention may be obtained by reading the following description of specific illustrative embodiments of the invention in conjunction with the appended drawing in which.

DETAILED DESCRIPTION OF THE PREFERRED EMBODIMENTS

The following detailed description includes a description of the best mode or modes of the invention presently contemplated. Such description is not intended to be understood in a limiting sense, but to be an example of the invention presented solely for illustration thereof, and by reference to which in connection with the following description and the accompanying drawing one skilled in the art may be advised of the advantages and construction of the invention.

Currently, electronic funds processors (EFPs) are commonly used in the industry for managing credit and debit card transactions between merchants and banks. This function often includes the collection of associated service fees by the EFP on behalf of the credit/debit card provider (for example, Visa/MC, Discover, and Diner's Club) for electronic funds transfer (EFT) to a merchant account. Alternatively, in the case of American Express (AMEX), service fees are first deducted before net sales (less service fees) are EFT deposited by AMEX in the merchant account.

In accordance with the present invention, a selective escrow method is disclosed in which a third party (the EFP)

collects merchant funds to be escrowed for payment of customer sales tax. The method can be described as follows.

Initially, information entered at a credit card/debit terminal (for example, entry of the credit/debit card number by swiping, and purchase amount and card expiration by keypad entry) is received by the EFP and forwarded to a credit/debit card issuer for authorization. Authorization is provided (for example, as indicated by an issuer-assigned confirmation number) and forwarded by the provider via the EFP to the merchant for storage in the credit card terminal. Currently, there are a number of manufacturers (for example, HYPERCOM, TRANS330, and NCR) making credit/debit card terminals (for example, MAC, NYCE, and check debit card) for use on the merchant level.

At the end of a transaction period (for example, at the end of each day), the merchant "closes out" credit/debit card sales at a credit card terminal, thereby requesting to the EFP that payments reflecting the daily sales be made to the merchant's account.

Once the EFP has obtained the request funds from the credit/debit card issuers, customer sales tax owing is debited from the gross taxable sales, and the net funds are sent on via EFT to the merchant's account or to another provider (such as American Express) for delivery to the merchant's account. The debited tax portion is credited to an escrow account for making future tax payments.

Because sales tax owed can be readily determined from the number, nature and place of merchant sales, the EFP can be provided with instructions to readily and automatically facilitate the escrow process in order to relieve the merchant from having to deal with holding funds aside and otherwise manage the process of making sales tax payments. Software currently used by the EFP to manage the credit/debit card issuer fee debiting process can be readily adapted to carry out the merchant instructions.

Once deposited in the escrow account, funds may be transferred at defined schedules to state tax authorities (or other owed parties) by the escrow agent in order to meet the merchant's tax payment obligations. In consideration for performing this service, the escrow agent may be reimbursed, for example, by retaining interest earned on funds ("float") in the account in between payment periods.

Figure 3:
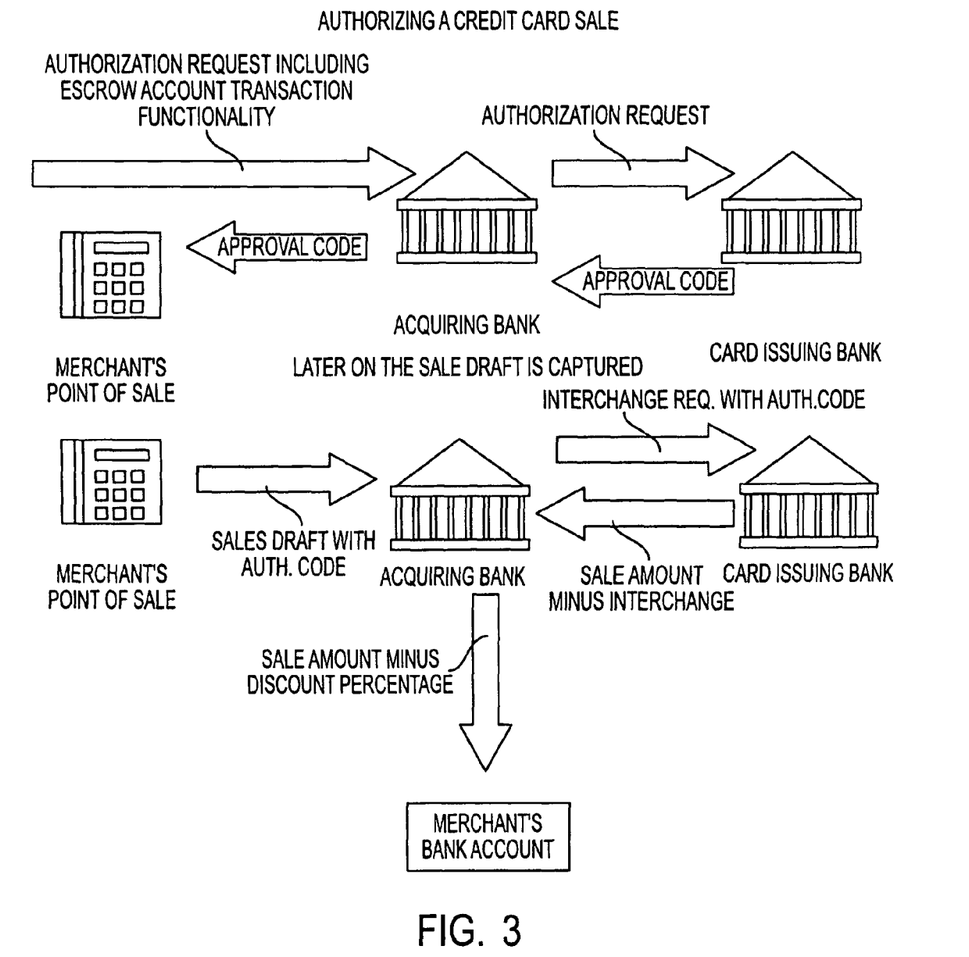
FIG. 3 provides a third schematic diagram illustrating a process for obtaining authorization for a credit card sale.

As previously noted, the method may be easily incorporated in the software the EFP currently uses, for example, to deduct the credit/debit card provider fees charged to the merchant for account transactions. FIG. 3 illustrates this present process. Credit/debit card providers charge whatever is a competitive rate to get a merchants business, and usually take their fees at the end of the month based on the merchant's gross sales. American Express takes its fees following each batch of transactions of recent transactions submitted by the merchant.

Accordingly, the present invention provides a method by which sales tax for customer sales transactions can be directly debited by an EFP from credit/debit card transactions, escrowed by a third party (for example, a major bank or other financial institution) and paid to the tax authority, all with little or no imposition of burden on the merchant. This method can be easily implemented, as the EFP is already processing credit/debit transactions in order to credit the gross amount of a credit card transaction, less the bank provider's fees, to the merchant's bank account. The method can also easily account for and discount sales transactions that are exempted from paying customer sales tax, so that no debit and escrow of such sums occurs from such transactions.

Customer sales tax owed for cash transactions (for example, payments made with physical currency, checks or other foreseeable items of monetary value) can also be accommodated by the present method. A number of approaches for escrowing customer sales tax accruing from cash transactions are contemplated by the present invention, and are disclosed as follows.

In a first approach, at the end of the day after closing out his/her credit card terminal and sending the transaction via EFT to EFT, the merchant "swipes" a card which can be called a "cash transaction tax debit" card or CTTD card, through his/her credit card terminal. This CTTD card may be be provided, for example, by a banking institution of the merchant for the purpose of facilitating debiting of the taxable portion of cash sales from the merchant's account at the banking institution for credit to the escrow account. As an alternative to using the CTTD card, the merchant may enter a banking institution provided personal identification number (PIN), or the credit/debit card terminal provide may provide a special function button on the terminal for this purpose. The special function button would allow the merchant to enter the total of his or her cash transactions, either daily or monthly or other selectable period, and transmit this information to the EFP.

A taxable portion of the reported cash transactions would be calculated by the EFP, debited from the merchant's account and credited to the escrow account. Of course, the merchant may prefer to perform the cash transaction closing process at a variety of intervals (for example, once monthly) instead of daily.

An alternative approach for collecting cash transaction sales tax, which may be preferred, is further described herein. As described previously, a merchant may be provided with either one of a swipe card or a PIN for processing cash transactions from the merchant's terminal when doing a close out. Both approaches allow the merchant to make what is referred to as a "forced entry" for the cash sales when closing out their terminal.

The forced entry provides information to the EFP indicating the total cash sales and how much sales tax to debit. Sales tax for cash sales could be escrowed, for example, by debiting it from the merchant's business checking account. For example, if sales tax is 6% and cash sales are $100, $6.00 would be debited from the merchant's checking account and credited to the tax escrow account along with the sales tax debited from credit card sales. The merchant would retain the cash from the cash sales and deposit it into his business checking account.

As an alternative, the "forced entry" may be eliminated by a method of tax debiting in which the reporting of cash and non taxable sales is integrated into the terminal closeout process.

Instead of a forced entry for the cash and non taxable sales, the credit/debit card terminal is configured to collect and report three sales transaction totals associated with a closeout period: one for credit card sales, one for cash sales and one for non taxable sales. This may be accomplished, for example, by suitable programming of the terminal (conventional terminals, for example, have been programmed to ask operators to report whether a transaction is taxable or non taxable) For each tax jurisdiction, the merchant's terminal is programmed to add the credit card and cash sales, subtract the non taxable sales, and calculate the percentage of tax to be escrowed based on the tax jurisdiction. The percentage of tax from the combined credit card and cash sales is then debited from authorized credit card funds, and deposited into the tax escrow account. The merchant retains all funds received from cash sales (and for example, may deposit these in the merchant bank account).

Figure 4A:
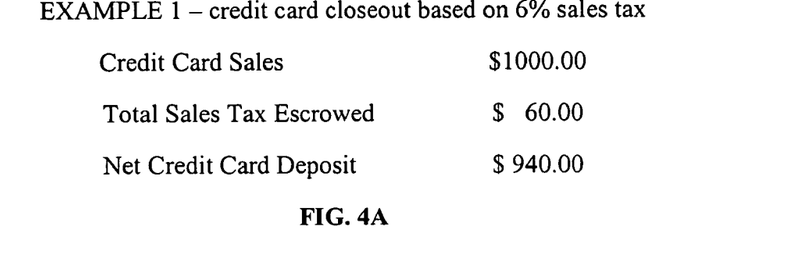
FIGS. 4A-4C illustrate sample escrow transactions involving non-credit/debit card sales.
Figure 4B:
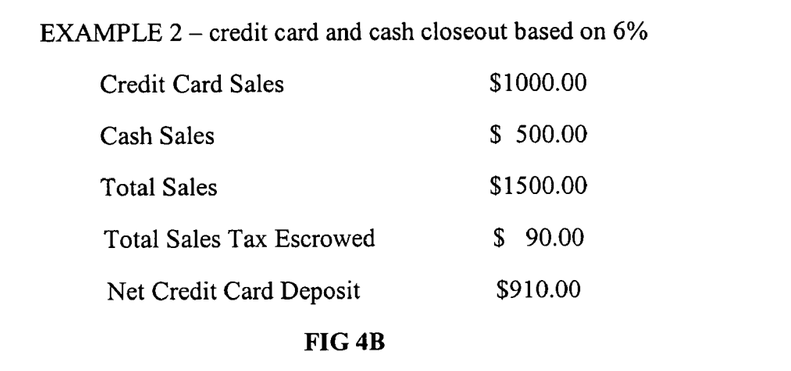
Figure 4C:
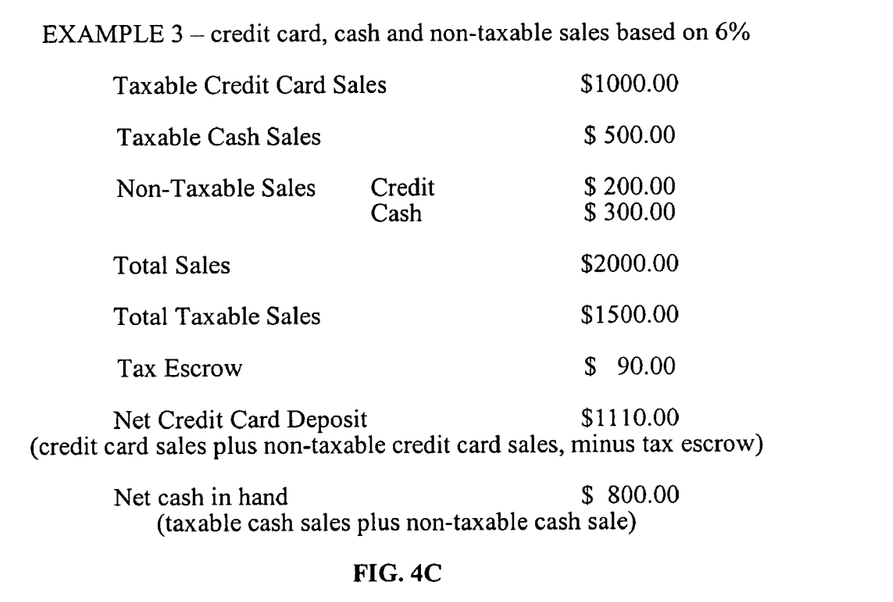

Three examples illustrating escrow transactions at the merchant terminal are illustrated in FIGS. 4A-4C. In FIG. 4A, all reported sales transaction in the closeout period are credit sales, each owing a 6% tax in a tax jurisdiction. Total sales tax escrow is computer based on the tax rate and total credit card sales, a net credit card deposit (less escrowed tax funds) is deposited in the merchant account.

In FIG. 4B, total credit and total cash sales are each reported for a closeout period, each owing a 6% tax in a tax jurisdiction. Credit and cash sales are totaled, and a total sales tax escrow is computed based on the tax rate and on total sales. A net credit card deposit (less escrowed tax funds representing tax owed both on credit and cash sales) is deposited in the merchant account.

In FIG. 4C, both taxable and non-taxable credit and cash sales totals are reported. For example, state laws may characterize certain sales as non-taxable (for example, clothes purchases in New Jersey are generally non-taxable). Each taxable sale owes a 6% tax in a tax jurisdiction. Taxable and non-taxable totals are prepared for both total credit and total cash sales during the closeout period, and a total sales tax escrow is computed based on the tax rate and on total taxable credit and cash sales. For example, all cash and credit sales may be totaled, and non-taxable cash sales and non-taxable credit sales may be subtracted from total cash and credit sales to produce total taxable sales. The tax rate is then applied to total taxable sales to determine the tax escrow. A net credit card deposit (total credit card sales less tax escrow and any other applicable service fees) is deposited in the merchant account. All cash collected remains in hand with the merchant.

In addition to escrowing funds for sale tax owed on cash sales, the above-disclosed method may be extended, for example, to sales made via mail/phone/fax orders and Internet sales.

In order to extend the method accordingly, mail/phone/fax sales and Internet sales may be identified with tax codes for taxable and non taxable sales. Currently, these sales may only be taxable if you are ordering from the same state in which the merchant is based, or alternatively if the merchant you are ordering from has a retail outlet in your state. The associated rules tend to be reasonably straight forward, and accordingly easily incorporated for example in existing software that the merchant may be using to track orders and delivery for such sales. Such merchant sales information could be reported to the EFP and escrow agent via an interface from the tracking software to the merchant terminal, or alternatively by other automated communications means (for example, e-commerce). An interface to the merchant terminal provides an advantage of enabling the merchant to close out these transactions coincidentally with closing other transactions recorded at the terminal.

As sales tax collected from mail/phone/fax order and Internet sales will generally be based on the tax jurisdiction in which the sale is initiated, a merchant must collect applicable sales tax based on the tax jurisdiction of where the sale is initiated, and file that tax in accordance with that jurisdiction's tax laws. Accordingly, each taxable sale would additionally identify the associated tax jurisdiction. Once again, the jurisdiction may be easily determined from a customer's order information, and means for determining the jurisdiction thereby easily incorporate in the merchant's existing order and delivery tracking software.

As a result, such information may be collected and provided to the escrow agent so that sales tax owed from mail/phone/fax sales and Internet sales within a closeout period can be escrowed out of credit sales receipts closed during the period, and sales tax filings and payments for mail/phone/fax and Internet order sales may automatically be filed on behalf of the merchant by the escrow agent on a schedule and as required by each of multiple jurisdictions. In addition to escrowing sales tax from credit or debit card orders for mail/phone/fax and Internet sales, by using the method described above for cash receipts, sales tax may also be escrowed for orders made for example using a personal check, money order, bank check, travelers check, gift check, gift certificate, cash or any other financial instrument used as cash. Future tax liabilities (for example, for Internet sales initiated outside of a merchant jurisdiction) may be easily accommodated by the method and reflected in modifications to the merchant's order and delivery tracking software.

As is described further herein, the present method may also be used for collecting other taxes, liens, garnishments and levies that may be imposed on a merchant by state and/or federal government agencies. For example, the method may provide for adjusting the rate of sales tax collection in order to address back taxes. In this manner, a merchant may for example reimburse a state sales tax authority for back taxes owed at a manageable rate, until the back taxes are repaid. For example, in a case where taxable sales receipts are taxed at a rate of 6%, the escrow rate may be adjusted upward (for example, to 16%) in order to collect against back sales tax owing. In the present provisional patent application, it is contemplated that the method could be applied to virtually any application in which a merchant desires or is otherwise required to effect a withholding of funds collected from credit-bases sales transactions, and for payment of escrowed merchant funds to any legitimate payee (for example, local, state and federal tax authorities, judicial authorities, and payees who have received legal judgments against a merchant). For example, in addition to the applications previously disclosed, it is contemplated that the method could be applied to generate merchant escrow funds for paying back payroll taxes or back real estate taxes, or for effecting a merchant savings account (in the latter case, the payee of funds escrowed would be the merchant).

It is also contemplated that the present method may be used for the purpose of creating multiple escrow funds simultaneously. For example, the merchant could specify more than one escrow rate each to be applied to one or more classes of eligible sales transactions. Preferably, the merchant terminal would be programmed for entry of such rates, and for reporting of the rates and associated merchant and transaction information to the EFP and escrow agent. The reported information would preferably and as applicable identify authorities and/or parties to whom associated escrowed funds would be disbursed at specified rates and schedules, and include conventional secure means for the merchant to authorize these transactions to begin and/or to end (for example, by digital signature). Optionally, for example for payments associated with legal judgments, such secure authorization means may be extended to other parties.

An important function of the present invention is to provide information about escrowed funds to the merchant, and to each tax jurisdiction in which sales tax receipts are being filed. As described herein, escrow account information can be provided at the merchant terminal at the time of a close out in a form, for example, similar to the sales draft created by the terminal in response to each sales transaction. In addition, the present method contemplates escrow account management software periodically used by the escrow agent, for example, to report a monthly summary to the merchant, and/or to prepare a filing return for filing tax receipts in a tax jurisdiction. If one or more types of funds are being escrowed, the monthly summary to the merchant may for example report the following information for each type: a) escrow funds collected over a current closeout period, and cumulatively for a designated number of prior closeout periods, b) escrow funds paid for a current payment period and cumulatively for a designated number of prior payment periods, and c) balance of funds owed (if the fund type relates, for example, to back taxes or other obligations not relieved in a single payment period).

The escrow agent may for example provide a secure web site for presenting escrow account information to the merchant and/or other payees (for example, the tax authorities). Alternatively, the escrow agent may physically or electronically transmit (for example, by e-mail, facsimile or other e-commerce means) escrow account information on a periodic basis directly to the merchant and/or payee.

Additional applications of the method beyond state sales tax collection for account transactions include any and all taxes which can be paid or charged at a point of sale (for example, Value Added Tax or VAT).

Summarizing, it is an achievement of the disclosed system and method that only the charges for goods/services and not the separate tax portion are transferred to the merchant's account—and the appropriate tax amount is transferred to an escrow account held by the bank who has the transfer relationship with the business owner. This escrow amount would be paid monthly or quarterly, for example to the state where the business transaction took place easily, speedily and accurately.

EFT systems are well known architecture. The software logic for deducting a certain percent of gross sales is also known as banks utilize it to take their fees. A system for filing tax money with a state is also known since banks regularly make tax payments for corporate clients. Yet none of the these systems presently offer advantages described in conjunction with the disclosed method.

Many present EFT systems provide effective security, for example such as encryption, as for moving money between accounts. The disclosed method contemplates a secure web based account available to the merchant that enables the merchant to check the status of their account with the escrow agent. In addition, as an alternative to cash transaction reporting, a web-based account may be provided to allow communications between the EFP and the merchant with regard to cash transactions.

The disclosed method may be used to exempt purchases made outside of a prescribed jurisdictional tax base. Alternatively, The method may be applied for multiple jurisdictions, for example, on a state-by-state level and/or national level. The method may also be applied to extract a service fee applied by the EFP.

The system and method can be customized to address any tax collection that involves tax liens and levies used by the State and Federal Government to collect back taxes from businesses. For example, many small and large businesses fall behind on taxes for any number of reasons and paying back taxes becomes very difficult and expensive for merchants because of penalties and interest and because businesses rarely have large chunks of excess funds to pay back taxes. The collection of back taxes by State and Federal Governments is also a difficult and expensive job because it involves manpower.

The disclosed method can be utilized by a state or federal government to levy a business for back taxes. For example, suppose a business owes back sales tax to the state. The state sales tax is 6%, but the state would levy the account 16% each month and collect an additional 10% towards back taxes until the debt was paid. In this case, the EFP and escrow agent would employ the disclosed method to act as the collection agents for the state or federal government, thereby cutting the state's collection costs and allowing the merchants to continue operating without extreme economic harm to their business. The method may also be used by collection companies to collect monies toward judgments won against businesses.

The disclosed system and method may be applied broadly in e-commerce. For example, sales tax may be charged on all e-commerce sales, to be collected in the state in which a sale takes place, analogous to catalog sales today. As the majority of e-commerce sales and catalog sales are credit card transactions, the method provides an sound basis for impounding escrow funds from e-commerce sales.

The disclosed method may also be used by small businesses to provide a forced savings plan. Many small businesses are S corporations with profits flowing through to the officers as income. To boost this income the EFP could offer to provide an additional debit to be moved into a savings account for the corporation. Many small businesses lack the discipline to save small amounts of money over time, a proven method of saving money. If the EFP offered the disclosed service to deduct an allocatable percentage from each transaction and funnel it, for example, into a bank-managed savings account digitally for the business, a whole new avenue of income is provided for the bank.

Figure 1:
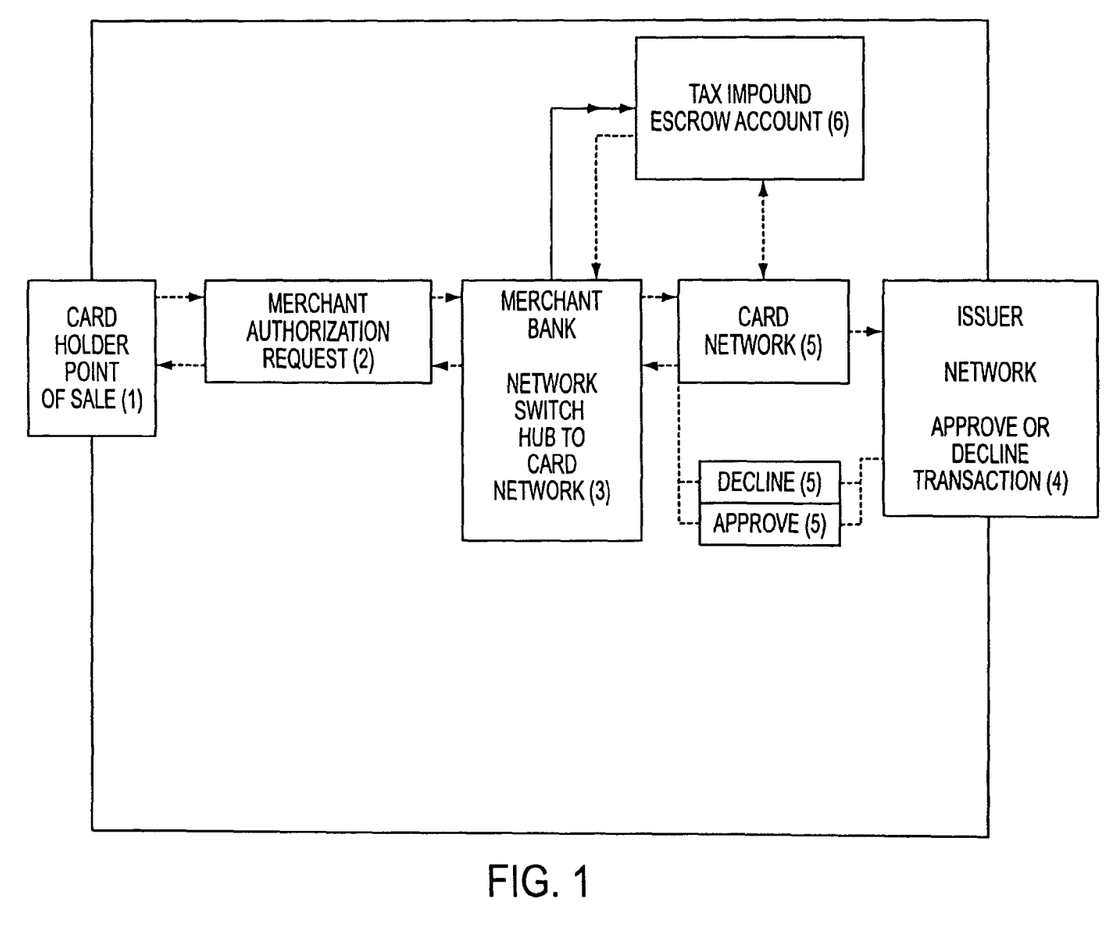
FIG. 1 provides a first schematic diagram illustrating elements of the inventive method.

A schematic diagram is provided in FIG. 1 illustrating elements of the method, which are described as follows:

1. The customer making a purchases presents a credit or debit card at the point of sale.
2. The merchant uses an electronic terminal or the telephone for example, to request an authorization from the credit/debit card provider/issuer via the EFP (depicted in FIG. 1 as a "merchant bank").
3. The merchant bank issues a payment authorization and request message to the card issuer that includes details about the account and the transaction, including escrow account transaction signals. This message may also be forwarded to the escrow agent.
4. The credit/debit card issuer reviews the authorization request, makes a decision to approve or decline it, and replies to the EFP. The issuer may also forward the reply to the escrow agent.
5. The EFP forwards the issuer's reply to the merchant. The response can also include information to decline, approve, and push escrow account information to the escrow agent.

It is foreseeable that in some cases, when a credit/debit card issuer is unavailable for authorization, the EFP may authorize the escrow account transaction as a part of a stand-in processing service.

The method may also be utilized by Independent Sales Organizations or ISOs. Independent sales organizations play a role in many business fields. In the credit card industry, ISOs act as a third party between the merchant and the acquiring bank. Many businesses are unable to obtain merchant status through an acquiring bank because the bank views them as too large a risk, and need to go through an ISO to obtain merchant status. Merchant status is activated when a business has authorization from an acquiring bank, ISO, or other financial institution to accept credit cards. Such status is required in order for the merchant to practice the disclosed method.

A variety of service providers may be selected to serve in the roles of EFP and escrow agent (for example, First Data, Telecheck, and Paymentech). In addition, a variety of credit card processing services such as EMS Nationwide, First of Omaha, First USA, Paymentech, First Union—Merchant Sales and Services, Nova Information Systems, Vantage Services, MasterCard, American Express, Discover, Worldwide, Citibank, First USA/BANK ONE, MBNA, Discover, J. P. Morgan Chase, Bank of America, Capital One, Household Bank, Providian, and Fleet may also serve in one or more of these roles.

Figure 2:
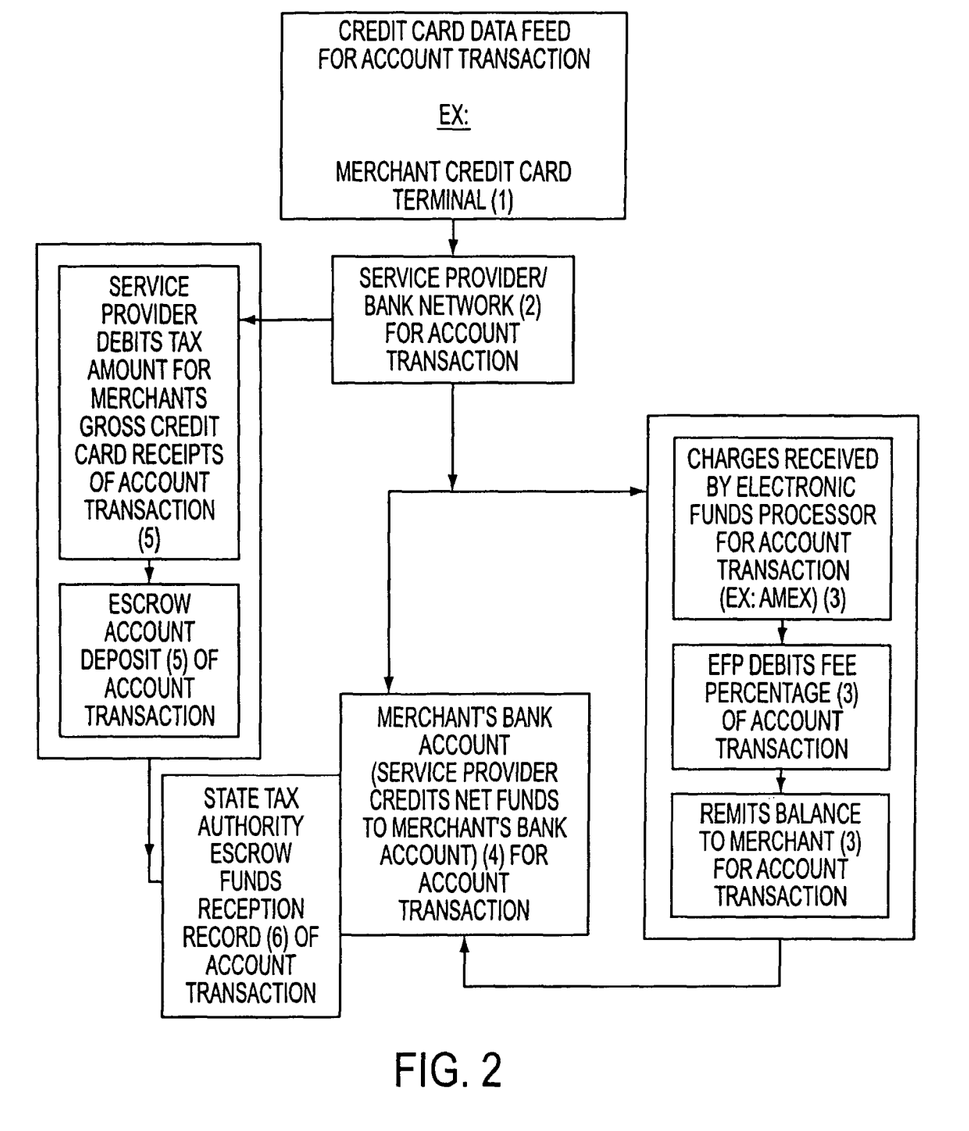
FIG. 2 provides a second schematic diagram illustrating elements of the inventive method.

FIG. 2 provides another view of the disclosed method.

A credit and data feed as shown in box 1 interlinks with a bank network (EFP) as shown in box 2. Charges are received by the EFP as shown in box 3. The EFP debits a fee percentage, and remits the balance to the merchant's bank account, as shown in box 4. At the same time, the EFP debits an allocated tax amount for a retailer's gross credit card receipt, and makes an escrow account deposit to the escrow account as shown in box 5.

The EFP and/or escrow agent may, for example, use several pricing models to derive revenues from the escrow account services and functionality provided. A first approach is for the EFP and/or escrow agent to charge based on a percentage figure of the overall value of escrow account transactions. A second method is to charge a flat fee for every escrow account transaction regardless of dollar amount. A third approach is for the PSP to charge a transactional fee based upon the volume of escrow account transactions processed.

The foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A computer-implemented method for impounding escrow funds by an electronic funds processor (EFP) in a computer system from credit or debit card transactions of a merchant associated with a closeout period, the method comprising the steps of:
   determining a first sales amount in the computer system EFP associated with one or more non-credit or non-debit card transactions of the merchant during the closeout period;
   determining a second sales amount in the computer system EFP associated with one or more credit or non-debit card transactions of the merchant during the closeout period;
   determining an escrow amount in the computer system EFP based on the first sales amount, wherein the escrow amount is determined as one of:
   (1) a predetermined percentage of one or more of the first and second sales amounts, and
   (2) a sum of a predetermined percentage of at least one of the first and second sales amounts,
   and wherein said predetermined percentage comprises:
   (1) a merchant tax rate, and
   (2) an estimate for generating escrow funds sufficient to pay a predetermined sum from the one or more of the first and second sales amounts over a predetermined number of sales periods;
   determining in the computer system EFP whether the second sales amount exceeds the escrow amount;
   crediting an escrow account with the escrow amount in the computer system EFP when the second sales amount exceeds the escrow amount;
   crediting a merchant account with an amount equal to the difference between the second sales amount and the escrow amount;
   determining a payable amount to be paid from the escrow account; and
   debiting the payable amount from the escrow account, wherein the payable amount is debited for payment to one or more of a local tax authority, a state tax authority, a federal tax authority, a judicial authority, a recipient of a legal judgment and a merchant.

2. The method of claim 1, wherein the one or more non-credit or non-debit card transactions are cash transactions.

3. The method of claim 1, wherein one or more non-credit or non-debit card transactions are each facilitated using a payment instrument selected from the group consisting of personal checks, money orders, bank checks, travelers checks, gift checks, gift certificates, and cash.

4. The method of claim 1, comprising the additional steps of:
   determining a payable amount to be paid from the first escrow account; and
   debiting the payable amount from the first escrow account.

5. A computer-implemented method for impounding escrow funds by an electronic funds processor (EFP) in a computer system from credit or debit card transactions of a merchant associated with a closeout period, the method comprising the steps of:
   determining a first sales amount in the computer system EFP associated with one or more taxable non-credit or non-debit card transactions of the merchant during the closeout period;
   determining a second sales amount in the computer system EFP associated with one or more taxable credit or debit card transactions of the merchant during the closeout period;
   determining a third sales amount associated with one or more non taxable credit or debit card transactions of the merchant during the closeout period;
   determining an escrow amount in the computer system EFP based on the sum of the first and second sales amounts, wherein the escrow amount is determined as one of:
   (1) a predetermined percentage of one or more of the first and second sales amounts, and
   (2) a sum of a predetermined percentage of at least one of the first and second sales amounts,
   and wherein said predetermined percentage comprises:
   (1) a merchant tax rate, and
   (2) an estimate for generating escrow funds sufficient to pay a predetermined sum from the one or more of the first and second sales amounts over a predetermined number of sales periods;
   determining whether the sum of the second and third sales amounts exceeds the escrow amount;
   crediting an escrow account with the escrow amount when the sum of the second and third sales amounts exceeds the escrow amount;
   crediting a merchant account with an amount equal to the difference between the sum of the second and third sales amounts and the escrow amount;
   determining a payable amount to be paid from the escrow account; and
   debiting the payable amount from the escrow account, wherein the payable amount is debited for payment to one or more of a local tax authority, a state tax authority, a federal tax authority, a judicial authority, a recipient of a legal judgment and a merchant.

6. The method of claim 5, wherein the predetermined percentage is increased over the merchant tax rate in order to facilitate payment of back taxes.

7. A computer-implemented method for impounding escrow funds by an electronic funds processor (EFP) in a computer system from sales transactions of a merchant associated with a closeout period, the method comprising the steps of:

determining a first sales amount in the computer system EFP associated with one or more sales transactions of the merchant during the closeout period;

determining a second sales amount in the computer system EFP associated with one or more credit or debit card transactions of the merchant during the closeout period;

determining an escrow amount in the computer system EFP based on the first sales amount, wherein the escrow amount is determined as one of:

(1) a predetermined percentage of one or more of the first and second sales amounts, and (2) a sum of a predetermined percentage of at least one of the first and second sales amounts, and wherein said predetermined percentage comprises:

(1) a merchant tax rate, and (2) an estimate for generating escrow funds sufficient to pay a predetermined sum from the one or more of the first and second sales amounts over a predetermined number of sales periods;

determining whether the second sales amount in the computer system EFP exceeds the escrow amount;

crediting an escrow account with the escrow amount when the second sales amount exceeds the escrow amount;

crediting a merchant account with an amount equal to the difference between the second sales amount and the escrow amount;

determining a payable amount to be paid from the escrow account; and debiting the payable amount from the escrow account, wherein the payable amount is debited for payment to one or more of a local tax authority, a state tax authority, a federal tax authority, a judicial authority, a recipient of a legal judgment and a merchant.

8. A computer-implemented method for impounding escrow funds by an electronic funds processor (EFP) in a computer system from sales transactions of a merchant associated with a closeout period, the method comprising the steps of:

determining a first sales amount in the computer system EFP associated with one or more sales transactions of the merchant during the closeout period;

determining a second sales amount in the computer system EFP associated with one or more credit or debit card transactions of the merchant during the closeout period;

determining a plurality of escrow amounts based on the first sales amount, wherein each of the plurality of escrow amounts are determined as one of:

(1) a predetermined percentage of one or more of the first and second sales amounts, and (2) a sum of a predetermined percentage of at least one of the first and second sales amounts, and wherein said predetermined percentage comprises:

(1) a merchant tax rate, and (2) an estimate for generating escrow funds sufficient to pay a predetermined sum from the one or more of the first and second sales amounts over a predetermined number of sales periods;

determining in the computer system EFP whether the second sales amount exceeds the sum of the plurality of escrow amounts; and crediting one of a plurality of escrow accounts with a corresponding one of the plurality of escrow amounts when the second sales amount exceeds the sum of the plurality of escrow amounts;

crediting a merchant account with an amount equal to the difference between the second sales amount and the sum of the plurality of escrow amounts;

determining a payable amount to be paid from one of the plurality of escrow accounts; and debiting the payable amount from one of the plurality of escrow accounts, wherein the payable amount is debited for payment to one or more of a local tax authority, a state tax authority, a federal tax authority, a judicial authority, a recipient of a legal judgment and a merchant.

* * * * *

UNITED STATES PATENT AND TRADEMARK OFFICE
CERTIFICATE OF CORRECTION

| | | |
|---|---|---|
| PATENT NO. | : 7,801,813 B2 | Page 1 of 1 |
| APPLICATION NO. | : 10/775751 | |
| DATED | : September 21, 2010 | |
| INVENTOR(S) | : Owen H. Brown et al. | |

It is certified that error appears in the above-identified patent and that said Letters Patent is hereby corrected as shown below:

In line 40 of column 9, claim 1 should be corrected to change "non-debit" to "debit", such that claim 1 reads as follows:

1. A computer-implemented method for impounding escrow funds by an electronic funds processor (EFP) in a computer system from credit or debit card transactions of a merchant associated with a closeout period, the method comprising the steps of:

determining a first sales amount in the computer system EFP associated with one or more non-credit or non-debit card transactions of the merchant during the closeout period;

determining a second sales amount in the computer system EFP associated with one or more credit or debit card transactions of the merchant during the closeout period;

determining an escrow amount in the computer system EFP based on the first sales amount, wherein the escrow amount is determined as one of:

(1) a predetermined percentage of one or more of the first and second sales amounts, and (2) a sum of a predetermined percentage of at least one of the first and second sales amounts, and wherein said predetermined percentage comprises:

(1) a merchant tax rate, and (2) an estimate for generating escrow funds sufficient to pay a predetermined sum from the one or more of the first and second sales amounts over a predetermined number of sales periods;

determining in the computer system EFP whether the second sales amount exceeds the escrow amount;

crediting an escrow account with the escrow amount in the computer system EFP when the second sales amount exceeds the escrow amount;

crediting a merchant account with an amount equal to the difference between the second sales amount and the escrow amount;

determining a payable amount to be paid from the escrow account; and debiting the payable amount from the escrow account, wherein the payable amount is debited for payment to one or more of a local tax authority, a state tax authority, a federal tax authority, a judicial authority, a recipient of a legal judgment and a merchant.

Signed and Sealed this
Third Day of May, 2011

David J. Kappos
*Director of the United States Patent and Trademark Office*